Patented Feb. 25, 1947

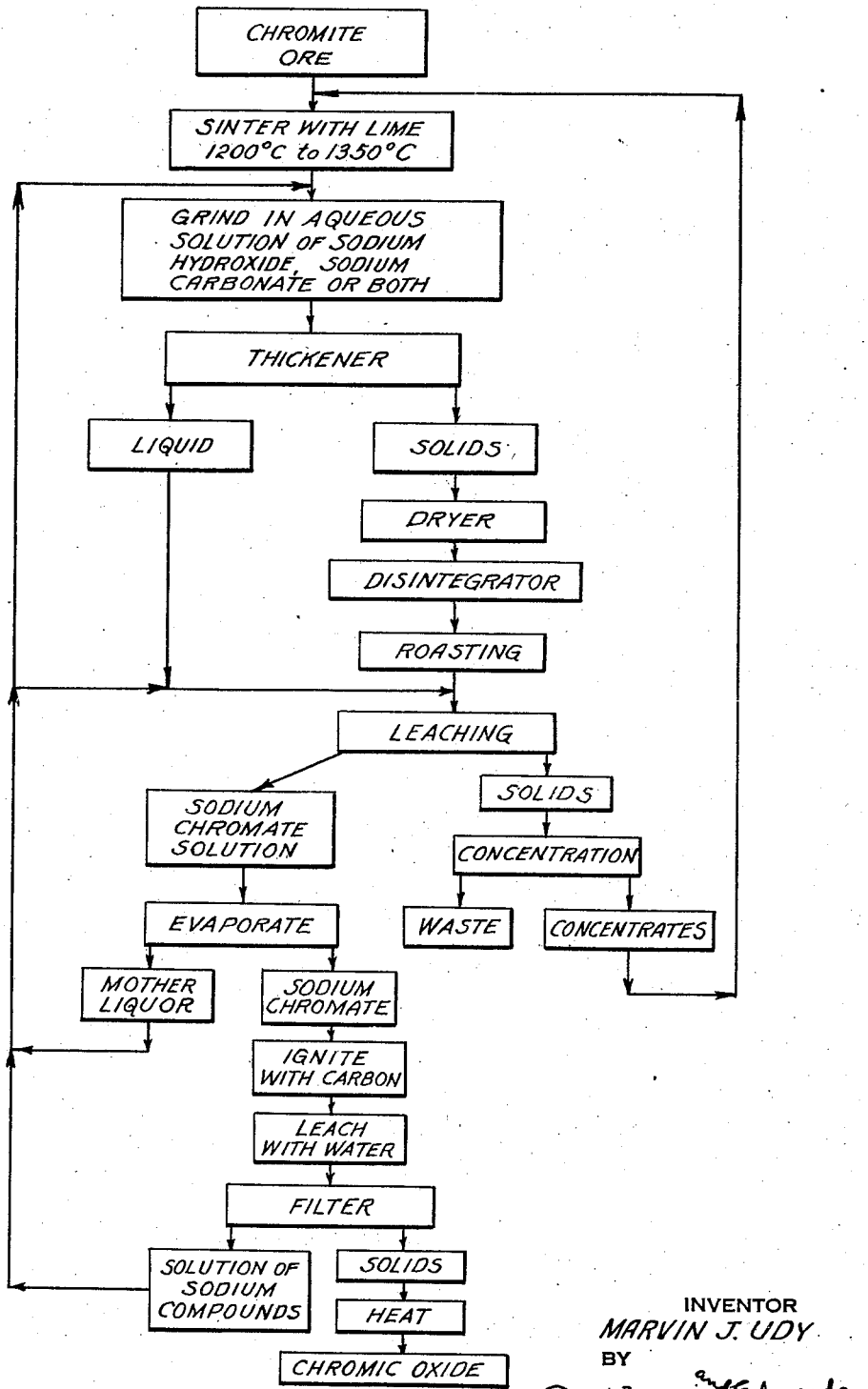

2,416,551

UNITED STATES PATENT OFFICE 2,416,551

PRODUCTION OF CHROMIUM COMPOUNDS

Marvin J. Udy, Niagara Falls, N. Y.

Application June 22, 1942, Serial No. 447,963

14 Claims. (Cl. 23—56)

This invention relates to chromium recovery and has for an object the provision of an improved method or process for recovering chromium from chromium-bearing materials such as chromite ore. More particularly, the invention contemplates the provision of an improved method or process for producing oxides of chromium as such or in chemical combination with basic oxides such as sodium oxide and calcium oxide. Another object of the invention is to provide certain improvements in methods or processes for producing chromates. A further object of the invention is to provide certain improvements in methods or processes for producing chromic oxide as such or in chemical combination with a basic oxide such as calcium oxide. The invention also contemplates the provision of an improved method or process for utilizing alkali metal compounds in obtaining relatively pure chromium compounds from crude chromium-bearing materials such as chromite ore.

Throughout the specification and in the claims, the term "chromite ore" is intended to include natural chromite ore, chromite ore concentrates and similar chromite mineral-bearing materials.

According to some heretofore customary processes, chromite ores are subjected to oxidizing or roasting treatments in the presence of one or more alkali metal compounds such, for example, as sodium carbonate, sodium hydroxide and sodium sulphate under such conditions as to oxidize the trivalent chromium of the chromite ore to the hexavalent state and produce alkali metal chromates such, for example, as sodium chromate. Sodium chromate thus produced is separated from the product of the roasting or oxidizing treatment by leaching and crystallization and marketed as such or converted to sodium dichromate for marketing. Chromium compounds such as chromic oxide, calcium chromite and calcium chromate are produced by suitable reduction or conversion treatments of commercial sodium chromate or sodium dichromate. Usually, the production of such compounds is carried out independently of the chromate production operations and, consequently, the sodium oxide content of the chromate compound is wasted or, at any rate, is not recovered in a form in which it is readily available for re-use in the chromate production operations. Therefore, chromic oxide, calcium chromite and calcium chromate are relatively costly commercial products. Such compounds are highly desirable materials for many industrial uses, but their usefulness is not fully developed because of high costs.

The present invention provides for the production of such compounds under conditions and according to procedures involving efficient production of alkali metal chromate and utilization of the alkali metal oxide content of chromate employed in the production of the compounds for producing additional chromate.

A complete preferred process of the invention comprises the following steps:

(1) Preliminary heating of a charge of chromite ore and calcium oxide in finely divided admixture to a temperature sufficiently high to sinter or melt the constituents thereof.

(2) Digestion of the product of the sintering treatment in finely divided form with an aqueous solution of caustic soda or sodium carbonate or both, and separation of the resulting aqueous liquid from residual solids.

(3) Oxidation or roasting of the residual solids from the digestion treatment in finely divided form in contact with an oxygen-containing gas such as air and in the presence of one or more alkali metal compounds in accordance with well known oxidizing or roasting procedures to produce alkali metal chromate.

(4) Separation of the chromate from other materials associated therewith in the oxidized or roasted charge as, for example, by leaching with an aqueous liquid followed by evaporation and crystallization.

(5) A concentration treatment, if desirable or necessary, to recover unoxidized chromite which may be returned to the process.

(6) Reduction of the chromate directly or after conversion to dichromate with the production of chromic oxide as such, or chromic oxide chemically combined with a basic oxide, and one or more alkali metal compounds suitable for use in the oxidation or roasting treatment of the residual solids from the digestion treatment.

(7) Utilization of the one or more alkali metal compounds thus produced in an oxidizing or roasting treatment of the residual solids from the digestion treatment or partly for that purpose and partly for leaching chromate-bearing material.

A preferred complete process of the invention also may involve the use of the aqueous liquid from the digestion treatment for digestion of additional material, for leaching the chromate-bearing product of the oxidizing or roasting treatment or for both purposes and use of mother liquor from the evaporation and crystallization treatment for leaching the chromate-bearing product of the oxidizing or roasting treatment, for the digestion of fused or sintered material or for both purposes.

The invention will be better understood from a consideration of the accompanying flow sheet, which illustrates one preferred method or process of the invention, in conjunction with the following discussion and description.

The present invention is based in part on my discovery that chromium-bearing materials of the nature of chromite ore can be made more amenable to treatment for the production of chromate compounds if a charge of the ore and lime in controlled amounts or proportions is heated to a temperature at least sufficiently high to sinter constituents of the charge and the resultant production thereafter subjected to a digestion and decomposition treatment with an alkali metal compound such, for example, as caustic soda (NaOH) or sodium carbonate ($Na_2CO_3$). The heating of the charge of chromite ore and lime may be merely sufficient to bring about a sintering of the constituents thereof, which may be accomplished at a temperature of about 1200° C., or between 1200° C. and 1350° C., or may be sufficiently intense to bring about a melting of the charge. The fusion treatment results in the formation of an altered or substituted chromite by bringing magnesia or lime or lime and magnesia into chemical combination with chromic oxide normally chemically combined with ferrous oxide, and in the production of calcium compounds of iron, aluminum, chromium and silicon such, for example, as calcium ferrite, calcium aluminate and calcium silicate. The fusion treatment also is capable of concentrating chromium-bearing minerals into relatively larger particles of high specific gravity which may be separated from associated gangue materials by ordinary concentration methods.

The digestion and decomposition treatment with an alkali metal compound appears to effect physical decomposition of calicum compounds of iron, aluminum, chromium and silicon formed in the fusion treatment with the production of simple oxides of those elements.

Products resulting from the fusion and decomposition treatments of the invention may be oxidized effectively in oxidation charges containing substantially smaller amounts of lime or other diluent material than the amounts required to prevent fusion in charges comprising other chromium-bearing materials commonly employed for chromate production. Effective oxidation may be carried out with oxidation charges comprising products resulting from the fusion and decomposition treatments of the invention and containing lime or other diluent material in amount not substantially greater than about fifty percent by weight of the amount of lime or other diluent material required for effective oxidation of charges comprising natural chromite ore.

The product of the fusion treatment may be subjected to the digestion and decomposition treatment with an alkali metal compound in any suitable manner. In a preferred process of the invention, the product of the fusion treatment is digested with a caustic aqueous solution of the alkali metal compound at a boiling temperature. The product of the fusion treatment preferably is ground to form a finely divided product consisting largely of particles small enough to pass a 100-mesh screen prior to being subjected to the decomposition treatment. Digestion of the product of the fusion treatment may be carried out advantageously by subjecting the product to a grinding treatment in the presence of the caustic aqueous digestion solution. Usually, digestion for a period of one hour to one and one-half hours accomplishes effective decomposition. The strength of solution employed will be determined to some extent, at least, by results sought to be accomplished. Thus, for example, if alumina recovery is desired, relatively strong solutions are employed. When recovery of alumina is not desirable, relatively dilute solutions are employed. Solutions containing not more than about twenty percent by weight of the alkali metal compound can be employed to decompose the fused products effectively without dissolving any substantial amounts of alumina contained therein. Solutions containing about twenty-five percent or more of the alkali metal compound can be employed to dissolve alumina effectively with the production of sodium aluminate in solution. In treating ores high in alumina, I prefer to employ strong decomposition solutions to produce solutions of sodium aluminate from which alumina may be recovered by standard methods. In treating ores low in alumina, or when alumina recovery is not commercially feasible, I prefer to employ relatively dilute decomposition solutions containing about ten to twenty percent by weight of the alkali metal compound. Caustic soda and sodium carbonate may be employed with about equal effectiveness.

After digestion of the fused product with the decomposition solution, the product is filtered or decanted and filtered to separate the solution from the solid decomposed material. The solid residue may be dried and mixed with lime or lime and soda ash, by grinding if necessary, to prepare a charge suitable for oxidation. Separation of the digestion solution from the solid materials may be so controlled as to provide for retention in the solid residue of sufficient sodium compound to form sodium chromate with all or a large proportion of unoxidized chromium remaining in the solid residue. The separated solution may be returned to the process for further use either directly or after suitable treatment for the recovery of any dissolved values such as alumina or sodium chromate which may be formed as the result of maintaining oxidizing conditions during digestion or during fusion and digestion, or the separated solution may be employed for leaching the chromate-bearing product resulting from subsequent oxidation or roasting of the solid residue from digestion.

Fusion of a charge containing lime and chromite ore may be carried out at a relatively low temperature of incipent fusion at which a product in the form of clinker will be produced, or, fusion of the charges may be carried out at a relatively high temperature at which a product in the form of a molten bath will be produced. Sintering or incipent fusion may be carried out at temperatures in the range 1200° C. to 1350° C. Fusion treatments of the invention may be carried out in any suitable type of furnace or heating equipment. For heating charges to temperatures of incipient fusion, I prefer to employ combustion heated furnaces of the type of cement kilns, and, for heating charges to melting temperatures, I prefer to employ the submerged arc type electric furnace. Other types of combustion furnaces which may be employed for fusion include reverberatories, cupolas and blast furnaces. In practicing the invention, fusion of a charge comprising chromite ore and lime may be carried out under neutral, oxidizing or reducing conditions. If fusion of the charge is carried out under controlled reducing conditions, some, or even substantially all, of the iron of the displaced ferrous oxide of the ferrous chromite may be reduced preferentially to the metallic state, leaving a large proportion or even substantially all, of the chromium unreduced. When the fusion treatment is carried out at a temperature such that the charge becomes molten, the metallic iron and the unreduced chromium will be contained in separable molten metal and slag layers, respectively, and they may be separated by procedures well known in the metallurgical art. When the fusion treatment is carried out at a relatively low temperature of incipient fusion and under reducing conditions, the metallic iron formed will be distributed in the form of small particles throughout the residual non-metallic material containing the unreduced chromium. Separation of the metal particles from the non-metallic material may be accomplished by any suitable means.

The amount of lime employed in the fusion treatment may be controlled to form calcium compounds of the iron oxide, alumina and silica associated with the chromic oxide of the ore and to form calcium chromite with any portion or all of the chromic oxide of the ore. The alkali decomposition treatment of the invention effectively decomposes calcium compounds, such as calcium ferrite, calcium aluminate, calcium silicate and calcium chromite, formed in the fusion treatment with the production of simple oxides such as ferric oxide, alumina, silica and chromic oxide.

In preparing chromium-bearing materials for subsequent treatment by oxidation methods to produce chromate compounds, I may employ lime in any suitable amount. The use of lime in an amount in excess of that equivalent to two molecules of calcium oxide for each molecule of chromic oxide, iron oxide, aluminum oxide and silica permits the solid product of the fusion and decomposition treatments to be subjected directly to the oxidation treatment without the use of additional lime and with substantially complete conversion of the chromium to the chromate form. All of the lime required for a subsequent oxidation treatment may be added in the charge subjected to the fusion treatment or a portion may be added in the charge subjected to the fusion treatment and the remainder may be mixed with the solid product of the decomposition treatment prior to commencement of the oxidation treatment.

In view of widely different characteristics of chromite ores from various sources, it usually is advisable to conduct preliminary laboratory tests in order to determine the charge compositions and operating conditions which will produce optimum results in plant operations.

In processes involving melting of the charges, the original charge materials may be employed in any suitable particle sizes. In processes involving sintering (incipient fusion) of the charges, the charge materials preferably are employed in the form of particles small enough to pass a 100-mesh screen or even small enough to pass a 200-mesh screen. (Screen sizes referred to in this application are based on the Tyler series.) Lime may be incorporated in the fusion and oxidation charges initially as calcium oxide or in the form of limestone (calcium carbonate). When the lime is employed initially as calcium carbonate, it is decomposed subsequently by heat with the production of calcium oxide.

The advantages of the fusion and digestion features of the process of the invention are illustrated by the following examples:

A quantity of sintered product was prepared by forming an intimate mixture consisting of finely divided chromite ore of the following composition and finely divided lime stone (53% CaO) in the proportions 100 parts of ore to 100 parts of lime stone, by weight, both the ore and the lime stone being ground to minus 100-mesh, and heating the mixture at a temperature of about 1300° C. for a period of time sufficiently long to accomplish sintering, and the sintered product, after cooling, was ground to form a finely divided product consisting of particles small enough to pass a 100-mesh screen.

Ore analysis

| | Per cent |
|---|---|
| $Cr_2O_3$ | 44.00 |
| FeO | 23.60 |
| $Al_2O_3$ | 13.80 |
| $SiO_2$ | 6.20 |
| MgO | 8.30 |
| CaO | 3.02 |

Example I

A portion of the finely divided sintered product was digested with an aqueous solution of sodium carbonate ($Na_2CO_3$) containing twenty percent (20%) sodium carbonate by weight at a boiling temperature for a period of about one hour. Digestion was carried out in an open vessel with the surface of the pulp in contact with atmospheric oxygen. The digestion pulp was filtered, and the solid residue was dried and intimately mixed with limestone and soda ash in amounts and proportions equal to 30 parts by weight of lime stone and 17.5 parts by weight of soda ash for each 100 parts by weight of chromite ore incorporated in the portion of the sintered product subjected to digestion. The mixture thus produced was roasted in air at about 850° C. to 1000° C. for about one and one-half hours.

The amount of soda ash employed in roasting the residue from the digestion treatment was about that required to form sodium chromate with one-half of the chromium present in the residue.

In the digestion treatment, about 15 percent of the chromium of the original chromite ore was converted to soluble sodium chromate. In the roasting treatment, about 95 percent of the chromium contained in the residue was converted to chromate.

Example II

A second portion of the finely divided sintered product was digested with an aqueous solution of sodium carbonate ($Na_2CO_3$) containing twenty percent (20%) sodium carbonate by weight at a boiling temperature for a period of about one hour. Digestion was carried out in an open vessel with the surface of the pulp in contact with atmospheric oxygen. The digestion pulp was filtered, and the solid residue was dried and intimately mixed with limestone and soda ash in amounts and proportions equal to 30 parts by weight of limestone and 35 parts by weight of soda ash for each 100 parts by weight of chromite ore incorporated in the portion of the sintered product subjected to digestion. The mixture thus produced was roasted in air at about 850° C. to 1000° C. for about one and one-half hours.

The amount of soda ash employed in roasting the residue from the digestion treatment was about that required to form sodium chromate with all of the chromium present in the residue.

In the digestion treatment, about 15 percent of the chromium of the original chromite ore was converted to soluble sodium chromate. In the roasting treatment, about 98.5 percent of the chromium contained in the residue was converted to chromate.

Example III

A third portion of the finely divided sintered product was mixed intimately with limestone and soda ash in amounts and proportions equal to 30 parts by weight of limestone and 17.5 parts by weight of soda ash for each 100 parts by weight of chromite ore incorporated in the portion of the sintered product employed. The mixture thus produced was roasted in air at about 850° C. to 1000° C. for about one and one-half hours.

In the roasting treatment approximately sixty-two percent (62%) of the chromium contained in the charge was converted to chromate.

As in Example I, the amount of soda ash employed in the charge subjected to the roasting treatment was about that required to form sodium chromate with about one-half of the chromium contained in the charge.

Example IV

A fourth portion of the finely divided sintered product was mixed intimately with lime stone and soda ash in amounts and proportions equal to 150 parts by weight of lime stone and 17.5 parts by weight of soda ash for each 100 parts by weight of chromite ore incorporated in the portion of the sintered product employed. The mixture thus produced was roasted in air at about 850° C. to 1000° C. for about one and one-half hours.

In the roasting treatment approximately eighty-two percent (82%) of the chromium contained in the charge was converted to chromate.

As in Examples I and III, the amount of soda ash employed in the charge subjected to the roasting treatment was about that required to form sodium chromate with about one-half of the chromium contained in the charge.

Example V

A fifth portion of the finely divided sintered product was mixed intimately with limestone and soda ash in amounts and proportions equal to 150 parts by weight of limestone and 35 parts by weight of soda ash for each 100 parts by weight of chromite ore incorporated in the portion of the sintered product employed. The mixture thus produced was roasted in air at about 850° C. to 1000° C. for about one and one-half hours.

In the roasting treatment approximately ninety-seven and one-half (97.5%) percent of the chromium contained in the charge was converted to chromate.

As in Example II, the amount of soda ash employed in the charge subjected to the roasting treatment was about that required to form sodium chromate with all of the chromium contained in the charge.

The advantages of the digestion and decomposition treatment of the invention in conditioning the product of the fusion treatment for subsequent oxidation by roasting in air will be apparent from a comparison of the results obtained in the various procedures described in the above examples. In the procedure of Example I, employing composition following fusion and with conditions otherwise the same as in Example III, total conversion to chromate in excess of ninety-five percent (95%) was accomplished as compared with sixty-two percent (62%) conversion in carrying out the procedure of Example III. Modification of the procedure of Example III by the inclusion of a relatively large amount of lime for diluent purposes resulted in raising conversion from sixty-two percent (62%) to eighty-two percent (82%), as indicated by Example IV. Example II shows total conversion of more than ninety-eight and one half percent (98.5%) through modification of the procedure of Example I by the inclusion of sufficient soda ash to form sodium chromate with all of the chromium present in the roasting charge instead of with only half of the chromium as in Example I. Modification of the procedure of Example III by the inclusion of sufficient soda ash to form sodium chromate with all of the chromium present in the charge required the inclusion also of a relatively large amount of diluent lime, as indicated by Example V. In the procedure of Example V, roasting with a lower proportion of lime was not feasible because of sintering induced by the presence of the large amount of soda ash.

Digestion of the sintered product under oxidizing conditions in accordance with the invention performs the three-fold function of (1) providing for rapid production and recovery of a substantial proportion of the chromium of chromite ore in the form of soluble alkali metal chromate, (2) decomposing chromite ore and making the chromic oxide content more readily amenable to oxidation by roasting in air, and (3) effecting reagent and operation economies by eliminating the necessity of employing large quantities of lime for dilution of roasting charges. The production of soluble chromate during the digestion treatment may be increased to some extent by conducting the fusion treatment at a relatively low temperature in the neighborhood of about 1200° C.

A further advantage of the digestion and decomposition treatment of the invention resides in the fact that effective conversion to chromate may be accomplished with the use of relatively small amounts of soda ash, lime in the charge providing the base for combination with the chromium trioxide produced. Effective conversion to chromate may be accomplished with charges comprising the decomposed product, lime and soda ash in which the amount of soda ash does not exceed that required for forming sodium chromate with about ten percent of the chromium of the charge. Charges containing soda ash in amount equal to that required for forming sodium chromate with about fifty percent of the charge may be oxidized readily and substantially completely. The use of relatively small amounts of soda ash in oxidation charges is highly advantageous because of elimination of fusing and balling difficulties encountered in oxidation of charges containing large amounts of soda ash.

In treating the solid products of the fusion and decomposition treatments directly to produce chromates, I prefer to form finely divided admixtures of the products with lime or lime and soda ash and roast the mixtures in air at temperatures above about 750° C. and below about 1000° C. until the desired degree or amount of conversion to chromate has been effected. I may employ lime and soda ash in any desired proportions, depending upon the end product sought to be obtained. If sodium chromate is sought, I may employ soda ash sufficient to form sodium chromate with all of the chromium present. If an alkali metal bichromate is sought, I may employ soda ash sufficient to form sodium chromate with about half of the chromium present and lime in excess of that required to form calcium chromate with the remainder of the chromium. A solution containing sodium bichromate may be obtained by leaching the product of the roasting treatment with water containing sulphuric acid.

In a complete process of the invention, the solid residue from the digestion treatment is roasted with sufficient soda ash to form sodium chromate with substantially all of the chromium contained in the residue, and the product of the roasting treatment is leached with the aqueous liquid from the digestion treatment containing caustic soda in substantial and predetermined amount.

The complete invention is based in part on my discovery that sodium hydroxide functions as a salting-out agent for sodium chromate when present in an aqueous solution of sodium chromate during evaporation treatment of the solution. I have discovered, also, that the presence of sodium hydroxide in leaching liquors in limited amounts up to about twenty-five to thirty percent by weight does not interfere with the leaching operation; that leaching liquors containing sodium hydroxide in such amounts can be employed substantially as effectively as pure water to produce final leaching liquors or solutions of sodium chromate containing sodium chromate in amounts equivalent to or greater than the amounts contained in final leaching solutions or liquors produced in commercial processes of the type employed heretofore. I have found that leaching liquor in the form of an aqueous solution containing an amount of sodium hydroxide up to about thirty percent of the weight of the water in the solution can be employed efficiently to produce a final leaching liquor or solution containing sodium chromate in an amount about in the range 150 to 400 grams per liter of solution, and that an evaporation treatment of the solution sufficient to raise the concentration of sodium hydroxide to about thirty-five to forty percent of the weight of the water in the solution will result in precipitation or crystallization from solution of from about thirty-five to ninety percent of the sodium chromate at a temperature of about 25° C. Thus, for example, an aqueous solution of sodium hydroxide can be employed efficiently to produce a final leaching liquor containing more than four hundred grams of sodium chromate per liter of solution, and evaporation of an amount of water sufficient to raise the sodium hydroxide content to forty percent of the weight of the water in the solution will result in precipitation or crystallization of sodium chromate corresponding to about three hundred fifty grams per liter of the final leaching solution upon cooling of the solution to about 25° C. Thus, evaporation of less than fifty percent of the water results in precipitation of about ninety percent of the dissolved sodium chromate. Evaporation of fifty percent of the water of a neutral aqueous solution of sodium chromate containing the same amount of sodium chromate would effect the precipitation or crystallization of little or no sodium chromate.

Leaching and evaporation efficiencies of the process of the invention are illustrated by the following table of results obtained in solubility tests carried out at room temperature (about 70° F.) employing pure water and water solutions of sodium hydroxide as solvents for sodium chromate:

| Percent NaOH in original solution | Grams of sodium chromate (Na₂CrO₄) per liter of final solution |
|---|---|
| 0 | 720 |
| 5 | 638 |
| 10 | 574 |
| 15 | 476 |
| 20 | 436 |
| 25 | 402 |
| 30 | 147 |
| 35 | 99 |
| 40 | 66 |

Final solutions were prepared by saturating the original solutions with sodium chromate at temperatures substantially higher than room temperature and thereafter cooling the solutions to room temperature to permit crystallization of excess sodium chromate to insure the production of saturated final solutions.

In the preferred process of the invention, I treat the crude sodium chromate-bearing material obtained by roasting the solid residue from the digestion treatment with an aqueous solution of sodium hydroxide comprising the aqueous solution employed for digestion of the product of the fusion treatment and containing sodium hydroxide in amount such as to provide for effective leaching with the production of a final leaching liquor containing the desired amount of sodium chromate. I then separate the leaching liquor from insoluble material contained in the crude chromate-bearing material and heat the leaching liquor to evaporate sufficient water to increase the sodium hydroxide concentration of the remainder of the solution to a point at which, upon cooling of the solution, a desired proportion of the sodium chromate of the original final leaching solution will be obtained in solid form. The resulting solution is separated from the solid sodium chromate and utilized, after dilution to the desired extent with water, partly for leaching additional sodium chromate-bearing material and partly for digestion of additional fused or sintered material. It is unnecessary to carry out complete evaporation of the leaching solution. The presence in the leaching solution of residual sodium chromate does not interfere with leaching. Evaporation need be carried out only to the extent that the amount of residual sodium chromate is not sufficiently large to form a burdensome load in the system.

Leaching of the crude chromate-bearing material may be carried out at any suitable temperature. Temperatures above about 25° C. may be employed satisfactorily. I prefer to conduct the leaching operation at a temperature between 25° C. and the boiling temperature of the leaching liquor, a temperature in the range 90° C. to 100° C. being satisfactory for most practical purposes.

In a preferred complete process of the invention, I leach the roasted charge with an aqueous solution of sodium hydroxide containing about twenty to thirty percent by weight of sodium hydroxide. Leaching preferably is conducted under conditions such as to produce a final leaching liquor containing about three hundred to four hundred grams of sodium chromate per liter because of practical considerations. The final leaching liquor is heated to effect evaporation of sufficient water to produce upon cooling to about 25° C., a solution containing less than one hundred grams of sodium chromate per liter and sodium hydroxide in amount equal to about thirty-five to forty percent of the weight of the water in the solution. The solution preferably is cooled to a temperature of about 25° C. or lower to effect precipitation of solid sodium chromate, and the liquid is separated from the solid sodium chromate, diluted with an amount of water corresponding to that evaporated and returned to the process for use in treating additional material.

Instead of relying solely upon cooling of the solution after evaporation to effect precipitation or crystallization of the sodium chromate, I may continue the evaporation treatment to the point at which precipitation or crystallization takes place during the course of evaporation. In such a case, I may effect further precipitation or crystallization by cooling after evaporation or I may dilute the mother liquor for re-use immediately after separation of the solid sodium chromate. For separating the solid sodium chromate from the mother liquor, I prefer to employ a centrifuging operation.

An additional advantage of the process of the invention over heretofore customary processes resides in the fact that the addition of an agent like sodium carbonate to the leaching liquor to convert difficultly soluble calcium chromate to soluble sodium chromate is unnecessary. The sodium hydroxide of the leaching liquor employed in the process of the invention reacts with any calcium chromate contained in the crude chromate-bearing material to form sodium chromate and relatively insoluble calcium hydroxide. The danger of carbonization of the caustic soda of the leaching liquor by carbon dioxide of the atmosphere is eliminated by virtue of the presence in the crude chromate-bearing material of caustic lime which functions to causticize the sodium carbonate which may be formed during the course of the process.

The solid residue remaining after leaching of the product of the roasting treatment may be wasted or subjected to a concentration treatment to separate and recover a concentrate containing unoxidized or undecomposed chromite. Concentrates thus produced may be returned to the process. Whether or not a concentration treatment may be included will be determined by the efficiency of the roasting and oxidizing treatment and, consequently, the quantity of unoxidized or undecomposed chromite remaining in the solid residue from the leaching treatment. A concentration treatment may be employed advantageously to effect economies with respect to operations and to effect higher and more uniform recoveries of chromium.

In order to accomplish effective oxidation of chromite, it is important that the roasting charge be kept porous to permit effective contact of an oxidizing gas such as air with the solid components of the charge. According to some heretofore customary practices, porosity is maintained by dilution of the charge with a refractory substance such as lime (CaO) and by control of temperature to avoid fusion. Customarily, charges employed for the production of alkali metal chromates by air oxidation or roasting comprise natural chromite ore, alkali metal compound in amount sufficient to form alkali metal chromate with substantially all of the chromium of the chromite ore and lime or other diluent material in amount equal to as much as three times the weight of the chromite ore. In the treatment of such charges at the high temperatures required for oxidation, even with the large amounts of diluent material usually included, it is difficult to avoid fusion with consequent reduction in the efficiency of oxidation, and, even under optimum conditions of operation, it is difficult or impossible to approach or accomplish complete oxidation. Satisfactory oxidation usually requires heating of the charge under oxidizing conditions for many hours.

Fusion of the roasting charge, in some cases, may be attributed to some extent to the presence in the charge of the large amount of relatively low-melting point alkali metal compound required to form alkali metal chromate with all of the chromium of the chromite ore and to the production of a relatively large amount of low-melting point alkali metal chromate in such cases. Fusion may be avoided to a large extent by employing the alkali metal compound in an amount substantially smaller than that required to form alkali metal chromate with all of the chromium of the chromite ore and thus avoiding the inclusion and production of large amounts of relatively low-melting point compounds. Ineffective or incomplete oxidation may be attributed to the exclusion of the oxygen of the air from contact with the chromite particles resulting from agglomeration of the charge particles or coating of the particles with alkali metal chromate produced in the roasting treatment. In employing rotary kilns and hearth furnaces provided with rabbling means in accordance with heretofore customary procedures, conversion to chromate of about eighty percent (80%) of the chromium of the chromite ore of a roasting or oxidizing charge can be accomplished quite efficiently, but higher degrees of conversion are difficult and relatively expensive to accomplish.

The concentration feature of the present invention provides improvements by means of which less dilute oxidation charges, or charges more concentrated with respect to chromium content, may be employed to effect improved recoveries of chromium in the form of chromate in shorter periods of time and with greater ease of handling and greater economy resulting from the use of the more concentrated charges.

The concentration feature of the invention is based in part on my observation that oxidation of the chromium of chromite-bearing material proceeds rapidly during the early stages of the oxidizing treatment and on my discovery that, at the conclusion of the oxidizing treatment, the unoxidized chromium still remains as a constituent of undecomposed chromite of the charge subjected to oxidation. I have observed, for example, that in a given charge, containing lime, chromite and an alkali metal compound such as sodium carbonate, in which a maximum of about ninety percent (90%) conversion to chromate can be effected in twelve to fourteen hours, a conversion of as much as eighty percent (80%) is effected within about three hours or less.

I have found that about the same amount of chromium will be oxidized in the initial stages of the oxidation treatment, whether the amount of alkali metal compound employed is sufficient to form alkali metal chromate with all of the chromium or with only about seventy to eighty percent (70 to 80%) of the chromium.

According to the present invention, the tendency of the charge to oxidize effectively with a limited amount of alkali metal compound may be taken advantage of to provide an oxidation charge (containing a limited amount of alkali metal compound) which sinters or fuses less readily under the conditions employed in the oxidation treatment, and the fact that the unoxidized chromium remains as a constituent of the original chromite may be taken advantage of to recover the unoxidized chromium by means of a concentration treatment. The use of a relatively small amount of alkali metal compound in the oxidation charge also permits the use of smaller amounts of diluent materials such as lime, and charges containing limited amounts of diluent material and alkali metal compound may be oxidized at higher temperatures with less danger of undesirable sintering or fusing resulting and with consequent increase in the rate of oxidation of the chromium. The components of the charge may also be employed in coarser states of sub-division. Thus, the use of a limited amount of alkali metal compound permits the use of substantially more concentrated and coarser oxidation charges which facilitates subsequent leaching and filtering operations and improves the efficiency of the oxidation treatment by reducing the time of oxidation. Charges consisting largely of particles small enough to pass a 100-mesh screen can be treated substantially as efficiently in the process of the invention as charges consisting largely of much smaller particles can be treated in processes of the type employed heretofore. The invention permits the use of smaller charges than those employed in heretofore customary processes to produce the same amounts of chromate.

Oxidation of the chromite ore in the presence of basic materials such as lime and alkali metal compounds results in decomposition of a large proportion of the chromite mineral of the charge with the production of decomposition products which have apparent specific gravities lower than the specific gravity of chromite mineral remaining undecomposed with the result that the undecomposed chromite mineral may be separated from the solid materials associated therewith by gravity concentration methods such, for example, as tabling and water classification. Compounds such as iron oxide, silica, alumina and magnesia initially associated with that portion of the chromite mineral which is decomposed in the oxidation treatment are converted in whole or in part into compounds of sufficiently low specific gravities or of such physical forms that they may be floated or washed away from the particles of undecomposed chromite mineral by means of water. My investigations have indicated that iron is the most difficult of the original constituents of the chromite mineral to separate from the undecomposed chromite mineral. The chromite mineral recovered by concentration may be contaminated to some extent with iron in the form of ferric oxide. If desired, this contaminating iron may be removed by treating the concentrate with an acid such as sulphuric acid in aqueous solution.

The solid insoluble residue remaining after separation of the soluble chromate may be subjected to a water classification or concentration treatment, preferably in the form of a table concentration operation in which the undecomposed chromite is separated by gravity from the lighter decomposition products associated therewith. The concentration treatment results in the recovery in the form of a low-volume concentrate of ninety percent (90%) or more of the undecomposed chromite. The chromium content of the original or rough concentrate is only slightly lower than the chromium content of the original chromite subjected to oxidation. A clean concentrate containing about the same chromium content as that of the original chromite may be produced by treating the rough concentrate with an acid such as sulphuric acid to remove iron oxide associated with the chromite particles.

By concentrating the residue remaining after separation of the soluble chromate from the oxidation charge and returning the concentrate to the process for oxidation to chromate an over-all recovery of chromium as chromate in excess of ninety percent (90%) can be accomplished consistently.

According to the invention, sodium chromate produced in the process is subjected to a reduction treatment directly or after conversion to dichromate with the production of chromic oxide, as such, or chromic oxide chemically combined with a basic oxide, and one or more sodium compounds suitable for use in the oxidation or roasting treatment of the solid residue of the digestion treatment. The one or more sodium compounds thus produced are utilized in the digestion of the fused or sintered product and in the oxidation or roasting treatment of the solid residue of the digestion treatment. Through the recovery and re-use of the alkali metal oxide of the chromate, the costs of producing compounds such as chromic oxide, calcium chomite and calcium chromate are reduced materially and a wider field of usefulness for such compounds is provided.

According to a preferred form of the invention, sodium chromate ($Na_2CrO_4$) or sodium dichromate ($Na_2Cr_2O_7$), in finely divided form, is intimately mixed with finely divided solid carbonaceous reducing material and ignited. Finely divided charcoal, coke or coal may be employed satisfactorily as the reducing material. Finely divided charcoal may be employed most advantageously for the production of pure products. Finely divided coke or coal may be employed when relatively impure products are satisfactory. When coal or coke is employed, the products resulting from reduction of the chromium of the chromate through elimination of a portion of the oxygen may be contaminated with coal or coke ash.

My investigations have indicated that reduction of alkali metal chromate and dichromate with carbon through ignition of intimate mixtures of the materials proceeds somewhat according to the following equations:

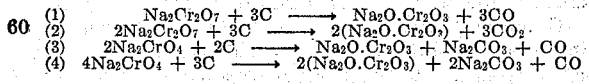

(1) $Na_2Cr_2O_7 + 3C \longrightarrow Na_2O.Cr_2O_3 + 3CO$
(2) $2Na_2Cr_2O_7 + 3C \longrightarrow 2(Na_2O.Cr_2O_3) + 3CO_2$
(3) $2Na_2CrO_4 + 2C \longrightarrow Na_2O.Cr_2O_3 + Na_2CO_3 + CO$
(4) $4Na_2CrO_4 + 3C \longrightarrow 2(Na_2O.Cr_2O_3) + 2Na_2CO_3 + CO$ It will be noted that the above equations indicate the production of sodium chromite ($Na_2O.Cr_2O_3$) and carbon monoxide or carbon dioxide in reducing sodium dichromate with carbon in different proportions relatively to sodium dichromate and the production of sodium chromite ($Na_2O.Cr_2O_3$), sodium carbonate and carbon monoxide in reducing sodium chromate. When the solid reaction product resulting from the reduction of sodium dichromate with carbon is digested with water (hot or cold), a solution of sodium hydroxide substantially free of sodium carbonate and a solid residue consisting essentially of chromic hydroxide (Cr(OH)₃) are produced. When the solid reaction product resulting from reduction of sodium chromate with carbon is digested with water, a solution of sodium hydroxide and sodium carbonate and a solid residue consisting essentially of chromic hydroxide (Cr(OH)₃) are produced.

Digestion of the solid products resulting from reduction does not effect hydrolysis or decomposition of all of the sodium chromite (Na₂O.Cr₂O₃) contained therein, and the solid residue consisting essentially of chromic hydroxide contains some sodium oxide probably chemically combined with chromic oxide as sodium chromite. The residual sodium oxide may be separated from the bulk of the chromic hydroxide by subjecting the residue resulting from digestion to an oxidizing treatment with air at an elevated temperature (above about 500° C.) and leaching the resulting product with water. The residual sodium oxide is converted to sodium chromate in the oxidizing treatment and the chromic hydroxide is converted to chromic oxide (Cr₂O₃).

Calcium chromite and sodium carbonate may be produced by forming and igniting an intimate mixture of finely divided sodium chromate or sodium dichromate, finely divided calcium oxide and finely divided carbon. It appears that the reactions proceed somewhat according to the following equations:

(5) $Na_2Cr_2O_7 + 2CaO + 2C \longrightarrow (CaO)_2Cr_2O_3 + Na_2CO_3 + CO$ (6) $2Na_2Cr_2O_7 + 4CaO + 3C \longrightarrow 2(CaO)_2.Cr_2O_3 + 2Na_2CO_3 + CO_2$ (7) $2Na_2CrO_4 + 2CaO + 3C \longrightarrow (CaO)_2.Cr_2O_3 + 2Na_2CO_3 + CO$ The sodium carbonate and calcium chromite produced in accordance with the reactions indicated by the above equations may be separated by digesting the solid reaction products with water, hot or cold. Calcium oxide may be employed as such or in chemical combination with carbon dioxide as calcium carbonate.

Equations 5 to 7 indicate the production of a compound approximating in chemical composition di-calcium chromite. Compounds approximating in chemical composition mono-calcium chromite or tri-calcium chromite may be produced by adjusting the proportions of chromate or dichromate and calcium oxide employed.

All of the reactions indicated by Equations 1 to 6 above are exothermic and usually proceed to completion without the application of heat from extraneous sources. When the calcium oxide is employed in the form of calcium carbonate and when the production of tri-calcium chromite is sought, it may be advisable to provide additional heat from extraneous sources to insure effective chemical combination of the calcium oxide with the chromic oxide.

Calcium chromate may be produced by roasting in air a solid residue obtained in the digestion of a solid reaction product resulting from the reduction of a chromate or dichromate in the presence of calcium oxide to produce calcium chromite. Substantially complete conversion to calcium chromate may be accomplished by roasting the di-calcium chromite and the tri-calcium chromite. Roasting of the mono-calcium chromite will result in the production of calcium chromate and chromic oxide. Complete conversion to chromate of the mono-calcium chromite may be accomplished by incorporating in the roasting or oxidizing charge at least one molecule of calcium oxide for each molecule of calcium chromite contained therein.

In a complete preferred process of the invention, sodium carbonate, sodium hydroxide or mixtures of sodium carbonate and sodium hydroxide obtained by digesting the solid products resulting from reduction of sodium chromate and sodium dichromate are employed in one or more of the oxidation or roasting, digestion and leaching treatments. The solutions obtained by digestion of the products of reduction may be evaporated partially or entirely to obtain solid sodium hydroxide or sodium carbonate or both, or to obtain sodium hydroxide, or sodium carbonate or both partly in the solid state and partly in solution for re-use in the process. Solutions containing sodium hydroxide may be passed in contact with gases, such as flue gases, containing carbon dioxide to carbonate the solution, or partly for the purpose of carbonating the solution and partly for the purpose of washing the gases, and produce, and convert the sodium hydroxide to, sodium carbonate or sodium bicarbonate or both.

The production of chromic oxide by reduction of sodium chromate with carbon is illustrated by the following example:

A reaction mixture was formed by grinding together 648 pounds of sodium chromate (Na₂CrO₄) and 46 pounds of carbon in the form of charcoal. The mixture was placed in a crucible, covered with finely divided charcoal and ignited by means of a gas flame. Upon ignition, the reaction proceeded quietly and smoothly.

The amount of carbon employed represents an excess of about thirty percent (30%) over that required to effect reduction of the chromate. It is desirable that sufficient excess carbon be employed to prevent reoxidation of the reaction product during cooling.

The solid reaction product was cooled under non-oxidizing conditions, digested by grinding in water to form a pulp to effect solution of sodium compounds and filtered. Hot or cold water may be employed for digestion. The filtrate obtained was an aqueous solution of sodium hydroxide and sodium carbonate. The solid residue, consisting essentially of chromic hydroxide (Cr(OH)₃), was roasted in air at an elevated temperature (1000° C.) to eliminate water and carbon and convert the chromium hydroxide to chromic oxide. The roasted product was 95 percent chromic oxide.

The chromic oxide-bearing product was leached with water to remove soluble compounds such as sodium chromate contained therein. The residue remaining after leaching was substantially pure chromic oxide. The sodium chromate thus obtained may be returned to the process. Conversion to chromic oxide of 97.5 percent of the chromium of the sodium chromate was effected.

It will be apparent that the various novel procedures or features of a complete process of the invention may be employed advantageously singly or in various combinations of two or more. The various solutions containing alkali metal compounds may vary in compositions and concentrations over wide ranges depending upon the different specific manipulative features which may be employed in the treatment of different ores and depending, also, upon the different degrees of efficiency sought to be achieved in the individual steps of a complete process. Obviously, other procedures than those particularly illustrated and described herein may be employed for utilizing the various solutions of alkali metal compounds advantageously in accordance with the invention. Alkali metal compound required for making up mechanical losses may be added at any appropriate stage of the process.

Any suitable apparatus may be employed in carrying out the various procedures of a complete process of the invention. Apparatus such, for example, as kilns, furnaces, thickeners, filters, dryers, disintegrators, evaporators, grinding mills and reaction vessels may be of conventional designs.

Various individual steps and procedures of the complete process of my invention are described and claimed in my copending applications Serial Nos. 351,128, filed August 3, 1940, now Patent No. 2,381,236; 401,297, filed July 5, 1941, now Patent No. 2,381,565; 252,743 filed January 26, 1939, now Patent No. 2,359,697; 401,298 filed July 5, 1941; 426,045, filed January 8, 1942; and 428,207 filed January 26, 1942. In those applications, I claim broadly the formation of the altered or substituted chromite and its subsequent digestion in a hot aqueous alkaline solution to produce a solid residue in which most of the chromium is still in the form of chromite, which residue, if desired, may be oxidized to chromate.

I claim:

1. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of an alkali-metal base, separating the aqueous solution from the residual solid matter, subjecting the residual solid matter, in the presence of an alkali-metal compound, to intimate contact with an oxidizing gas at a temperature sufficiently high to convert chromium contained therein to an alkali-metal compound of chromium containing chromium in the hexavalent state, and reducing the alkali-metal compound of chromium to produce chromic oxide and an alkali-metal compound.

2. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of caustic soda, separating the aqueous solution from the residual solid matter, subjecting the residual solid matter, in the presence of a sodium compound, to intimate contact with an oxidizing gas at a temperature sufficiently high to convert chromium contained therein to a sodium compound of chromium containing chromium in the hexavalent state, reducing the sodium compound of chromium to produce chromic oxide and caustic soda, and returning the caustic soda thus produced for treatment of additional altered chromite.

3. The method of recovering chromium from chromite ore which comprises forming a charge of the ore and lime, heating the charge to a temperature above 1200° C., and at least sufficiently high to cause sintering of constituents of the charge and to produce a product containing an altered chromite formed by substitution of the lime for ferrous oxide of the chromite of the original chromite ore, decomposing the altered chromite by digestion with an aqueous solution of an alkali-metal base, separating the aqueous solution from the residual solid matter, subjecting the residual solid matter, in the presence of an alkali-metal compound, to intimate contact with an oxidizing gas at a temperature sufficiently high to convert chromium contained therein to an alkali-metal compound of chromium containing chromium in the hexavalent state, separating the alkali-metal compound of chromium from other material associated therewith in the product of the oxidizing treatment, and reducing the separated alkali-metal compound of chromium to produce chromic oxide and an alkali-metal compound.

4. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of a compound from the class consisting of sodium hydroxide and sodium carbonate, separating the aqueous solution from the residual solid matter, subjecting the residual solid matter, in the presence of a sodium compound, to intimate contact with an oxidizing gas at a temperature sufficiently high to convert chromium contained therein to sodium chromate, separating sodium chromate from other material associated therewith in the product of the oxidizing treatment, heating the separated sodium chromate in the presence of a carbonaceous reducing agent to form a product comprising a sodium compound and a water-insoluble compound of chromium, separating the sodium compound from the insoluble chromium compound, and returning the separated sodium compound for treatment of additional altered chromite.

5. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of a compound from the class consisting of sodium hydroxide and sodium carbonate, separating the aqueous solution from the residual solid matter, subjecting the residual solid matter, in the presence of a sodium compound, to intimate contact with an oxidizing gas at a temperature sufficiently high to convert chromium contained therein to sodium chromate, separating sodium chromate from other material associated therewith in the product of the oxidizing treatment, heating the separated sodium chromate in the presence of a carbonaceous reducing agent to form a product comprising a sodium compound and chromic oxide, separating the sodium compound from the chromic oxide, and returning the separated sodium compound for treatment of additional altered chromite.

6. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of a compound from the class consisting of sodium hydroxide and sodium carbonate, separating the aqueous solution from the residual solid matter, subjecting the residual solid matter, in the presence of a sodium compound, to intimate contact with an oxidizing gas at a temperature sufficiently high to convert chromium contained therein to sodium chromate, separating sodium chromate from other material associated therewith in the product of the oxidizing treatment, heating the separated sodium chromate in the presence of a carbonaceous reducing agent to form a product comprising a sodium compound and calcium chromite, separating the sodium compound from the calcium chromite, and returning the separated sodium compound for treatment of additional altered chromite.

7. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with sodium carbonate, separating the aqueous solution from the residual solid matter, subjecting the residual solid matter, in the presence of an alkali-metal compound, to intimate contact with an oxidizing gas at a temperature sufficiently high to convert chromium contained therein to sodium chromate, converting the sodium chromate to sodium dichromate, reducing the sodium dichromate with a carbonaceous reducing agent, in the presence of calcium oxide, to form a product comprising sodium carbonate and a water-insoluble compound of chromium, separating the sodium carbonate from the water-insoluble chromium compound and returning the sodium carbonate for further treatment of altered chromite.

8. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of an alkali-metal base, separating the aqueous solution from the residual solid matter, subjecting the residual solid matter, in the presence of an alkali-metal compound, to intimate contact with an oxidizing gas at a temperature sufficiently high to convert chromium contained therein to an alkali-metal compound of chromium containing chromium in the hexavalent state, leaching the product of the oxidizing treatment with an aqueous solution of caustic soda to form a solution of sodium chromate, separating the solution of sodium chromate from residual solid matter, heating the solution of sodium chromate to crystallize sodium chromate therefrom, and reducing the crystallized sodium chromate to produce a sodium compound and a water-insoluble compound of chromium.

9. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of an alkali-metal base, separating the aqueous solution from the residual solid matter, subjecting the residual solid matter, in the presence of an alkali-metal compound, to intimate contact with an oxidizing gas at a temperature sufficiently high to convert chromium contained therein to an alkali-metal compound of chromium containing chromium in the hexavalent state, leaching the product of the oxidizing treatment with an aqueous solution of caustic soda to form a solution of sodium chromate, separating the solution of sodium chromate from residual solid matter, heating the solution of sodium chromate to crystallize sodium chromate therefrom, and reducing the crystallized sodium chromate with a carbonaceous reducing agent to produce a sodium compound and chromic oxide.

10. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of an alkali-metal base, separating the aqueous solution from the residual solid matter, subjecting the residual solid matter, in the presence of an alkali-metal compound, to intimate contact with an oxidizing gas at a temperature sufficiently high to convert chromium contained therein to an alkali-metal compound of chromium containing chromium in the hexavalent state, leaching the product of the oxidizing treatment with an aqueous solution of caustic soda to form a solution of sodium chromate, separating the solution of sodium chromate from residual solid matter, heating the solution of sodium chromate to crystallize sodium chromate therefrom, and reducing the crystallized sodium chromate in the presence of calcium oxide to form a product comprising sodium carbonate and calcium chromite.

11. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of sodium carbonate, separating the aqueous solution from the residual solid matter, subjecting the residual solid matter, in the presence of an alkali-metal compound, to intimate contact with an oxidizing gas at a temperature sufficiently high to convert chromium contained therein to an alkali-metal compound of chromium containing chromium in the hexavalent state, leaching the product of the oxidizing treatment with an aqueous solution of caustic soda to form a solution of sodium chromate, separating the solution of sodium chromate from residual solid matter, heating the solution of sodium chromate to crystallize sodium chromate therefrom, reducing the crystallized sodium chromate with carbon in the presence of calcium oxide to form a product comprising sodium carbonate and calcium chromite, separating the sodium carbonate from the calcium chromite, and returning the sodium carbonate for further treatment of altered chromite.

12. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of a compound from the class consisting of sodium hydroxide and sodium carbonate, separating the aqueous solution from the residual solid matter, subjecting the residual solid matter, in the presence of an alkali-metal compound, to intimate contact with an oxidizing gas at a temperature sufficiently high to convert chromium contained therein to sodium chromate, bringing the product of the oxidizing treatment into intimate contact with the aqueous solution employed in the digestion treatment of the altered chromite to separate sodium chromate from other materials associated therewith, concentrating such other materials to separate and recover undecomposed chromite, reducing the sodium chromate in the presence of calcium oxide to produce a sodium compound and chromic oxide in chemical combination with calcium oxide, and returning the sodium compound and the undecomposed chromite for mixing with further amounts of additional altered chromite.

13. The method of recovering chromium from chromite ore which comprises heating a charge of the ore and lime to a temperature above 1200° C., and at least sufficiently high to cause sintering of constituents of the charge and to produce a product containing an altered chromite formed by substitution of the lime for ferrous oxide of the chromite of the original ore, decomposing the altered chromite by digestion with an aqueous solution of a compound from the class consisting of sodium hydroxide and sodium carbonate, separating the aqueous solution from the residual solid matter, subjecting the residual solid matter, in the presence of a sodium compound, to intimate contact with an oxidizing gas at a temperature sufficiently high to convert sodium contained therein to sodium chromate, separating sodium chromate from other materials associated therewith in the product of the oxidizing treatment, concentrating such other materials to separate and recover undecomposed chromite, reducing the sodium chromate in the presence of calcium oxide to produce a sodium compound and chromic oxide in chemical combination with calcium oxide, separating the sodium compound, and returning the separated sodium compound for further treatment of additional altered chromite.

14. The method of recovering chromium from chromite ore which comprises forming a charge of the ore and a basic compound of the group consisting of lime and magnesia capable of substituting for the ferrous oxide of the ferrous chromite of the ore to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromite ore, decomposing the altered chromite by digestion with an aqueous solution of caustic soda, separating the aqueous solution from the residual solid matter, subjecting the residual solid matter, in the presence of an alkali metal compound, to intimate contact with an oxidizing gas at a temperature sufficiently high to convert chromium contained therein to an alkali metal compound of chromium containing chromium in the hexavalent state, leaching the product of the oxidizing treatment with an aqueous solution of caustic soda to form a solution of sodium chromate and caustic soda, separating undecomposed chromite from such resulting solution, separating sodium chromate from said sodium chromate-caustic soda solution, and returning the remaining solution including caustic soda and the previously separated undecomposed chromite for mixing with further amounts of additional altered chromite.

MARVIN J. UDY.

REFERENCES CITED

The following references are of record in the file of this patent:

UNITED STATES PATENTS

| Number | Name | Date |
| --- | --- | --- |
| 1,752,863 | Tarr | Apr. 1, 1930 |
| 1,948,143 | Tarr | Feb. 20, 1934 |
| 1,901,939 | Vetter | Mar. 21, 1933 |
| 1,893,761 | Caspari | Jan. 10, 1933 |
| 1,723,556 | Meyer et al. | Aug. 6, 1929 |
| 524,470 | Slocum | Aug. 14, 1894 |
| 1,866,648 | Hackhofer | July 12, 1932 |
| 1,531,088 | Fuller | Mar. 24, 1925 |
| 219,637 | Gorman | Sept. 16, 1879 |

FOREIGN PATENTS

| Number | Country | Date |
| --- | --- | --- |
| 11,311 | British | 1891 |

OTHER REFERENCES

H. A. Doerner, "A Study of Methods for Producing Chromate Salts and Domestic Ores," in U. S. Bureau of Mines, Bulletin 5, Sept. 1939 (State College of Washington). (Copy in Division 59, 23/56.)